Feb. 27, 1934.  C. P. BROCKWAY  1,948,491

APPARATUS FOR FORMING AND CURING BRAKE LININGS

Filed April 17, 1931  4 Sheets-Sheet 1

INVENTOR
CARL P. BROCKWAY
BY
ATTORNEY

Feb. 27, 1934.  C. P. BROCKWAY  1,948,491
APPARATUS FOR FORMING AND CURING BRAKE LININGS
Filed April 17, 1931  4 Sheets-Sheet 2

INVENTOR
CARL P. BROCKWAY
BY
ATTORNEY

Feb. 27, 1934.  C. P. BROCKWAY  1,948,491
APPARATUS FOR FORMING AND CURING BRAKE LININGS
Filed April 17, 1931  4 Sheets-Sheet 3

INVENTOR
CARL P. BROCKWAY
BY
ATTORNEY
Chester H Bracelton

Feb. 27, 1934.  C. P. BROCKWAY  1,948,491
APPARATUS FOR FORMING AND CURING BRAKE LININGS
Filed April 17, 1931   4 Sheets-Sheet 4
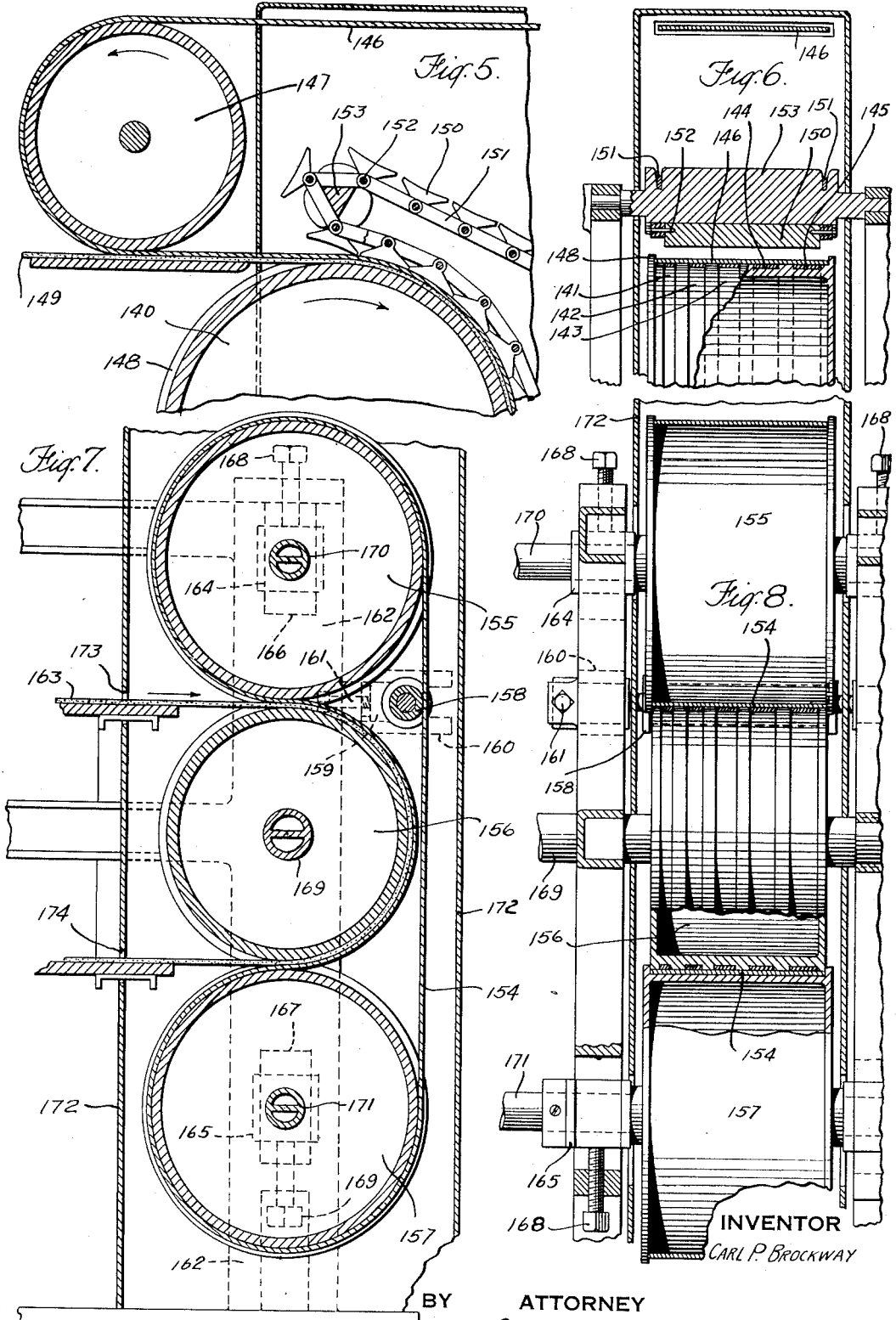
INVENTOR
CARL P. BROCKWAY
BY ATTORNEY
Chester H. Braselton Patented Feb. 27, 1934

1,948,491

UNITED STATES PATENT OFFICE 1,948,491

APPARATUS FOR FORMING AND CURING BRAKE LININGS

Carl P. Brockway, Ridgewood, N. J., assignor to World Bestos Corporation, Paterson, N. J., a corporation of Delaware Application April 17, 1931. Serial No. 530,828

10 Claims. (Cl. 18—6)

This invention relates to a method and an apparatus for forming and curing brake lining and may be effectively used in connection with the process described in the application of William Nanfeldt entitled "Molded brake lining and apparatus for making the same", Serial No. 512,892, filed February 2, 1931.

One of the objects of the invention is to provide a method and an apparatus for heat treating and compressing a continuous strip of brake lining.

Another object of the invention is to provide a method and an apparatus for compressing a strip of brake lining so that there will be a minimum increase in length thereof.

Another object of the invention is to provide an apparatus for compressing a continuous strip of brake lining whereby the pressure is applied over a relatively long section thereof and throughout a predetermined period of time as the brake lining is moved continuously through the apparatus.

Another object of the invention is to provide a machine for compressing brake lining, the pressure being applied and released gradually over a relatively long section of the brake lining as such lining is continuously passed through the machine.

Other objects and objects relating particularly to the construction and assembly of the various parts of the apparatus will be apparent as the description of the invention proceeds.

Several embodiments of the invention have been illustrated in the accompanying drawings in which:

Fig. 5 is a sectional side elevation of a portion of a modified form of the invention;

Fig. 6 is a front sectional view of the construction of Fig. 5;

Fig. 7 is a sectional elevation of another embodiment of the machine; and

Fig. 8 is a front sectional view of the construction shown in Fig. 7.

Figure 1:
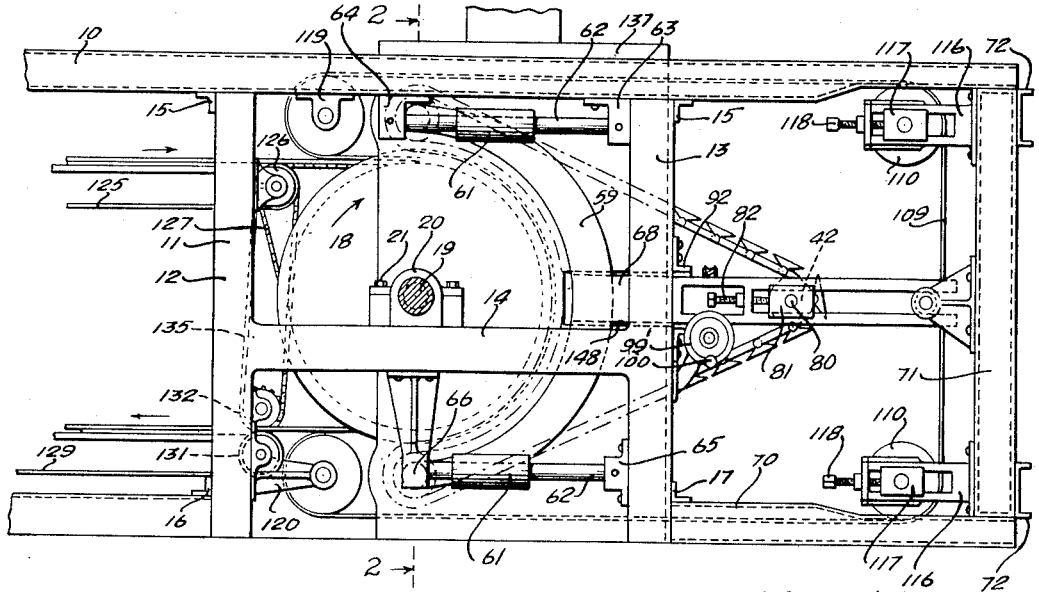
Fig. 1 is a side elevational view of the machine.

The invention is adapted to perform one step in the process of making brake linings as described and claimed in the application referred to above. In this application the brake lining is described as being extruded from plastic material containing asbestos fibres and rubber, pressed into substantially the shape and size required, then compressed again under the influence of heat so as to cure the lining as well as press it thereby vulcanizing the rubber, and subsequently calendered and surfaced. The present invention is adapted to form the third step of the process, namely, the simultaneously heat treating and compressing step.

Referring now more specifically to the drawings the apparatus is shown mounted in a frame work comprising a pair of longitudinal channel beams 10 spaced apart from each other and supported by side members 11 having front and rear channel uprights 12 and 13 respectively and a horizontal member 14 joining the two uprights together. The channels 10 and supporting members 11 are positioned in spaced relation by angles 15 which are connected to the uprights 12 and the channels 10 at their intersections and to the uprights 13 and the channels 10 at their intersections. Angles 15 connect the uprights 12 and angles 17 connect the uprights 13 at their lower ends.

A hollow drum 18 is mounted between the side members 12 upon a shaft 19 which is supported in bearings 20 mounted upon the longitudinal members 14 by means of suitable bolts 21. Sleeves 22 may be formed integral with the drum on each side thereof to extend outwardly to the inner faces of the bearings 20 so as to form a means to space the drum in its proper position between the bearings.

The drum is rotated by means of a motor 23 which is rotatably connected with suitable reduction gears enclosed in a housing 24 and provided with a driven pinion 25 which meshes with a gear wheel 26 attached to the end of the shaft 19. The gear ratio in the housing 24 may be adjusted by means of a lever 27 which protrudes through guiding slots 28 in the housing so that the speed of the drum 18 may be controlled within certain limits.

The drum 18 is hollow and the shaft 19 is provided with an inlet duct 29 and an outlet duct 30, the former communicating with the interior of the drum by means of an opening 31 in the shaft and the latter communicating with the interior of the drum by means of an opening 32 in the shaft, so that steam or other heated fluid may be circulated through the drum while the machine is in operation. Any suitable type of rotating connections may be used at the ends of the shaft 19 whereby steam connections may be made to lead the heated fluid into and out of the end of the shaft. The outer surface of the drum is provided with a plurality of grooves 33, 34, 35, 36, and 37 corresponding in width to a plurality of strips 38 of brake band lining representing several standard sizes.

Figure 4:
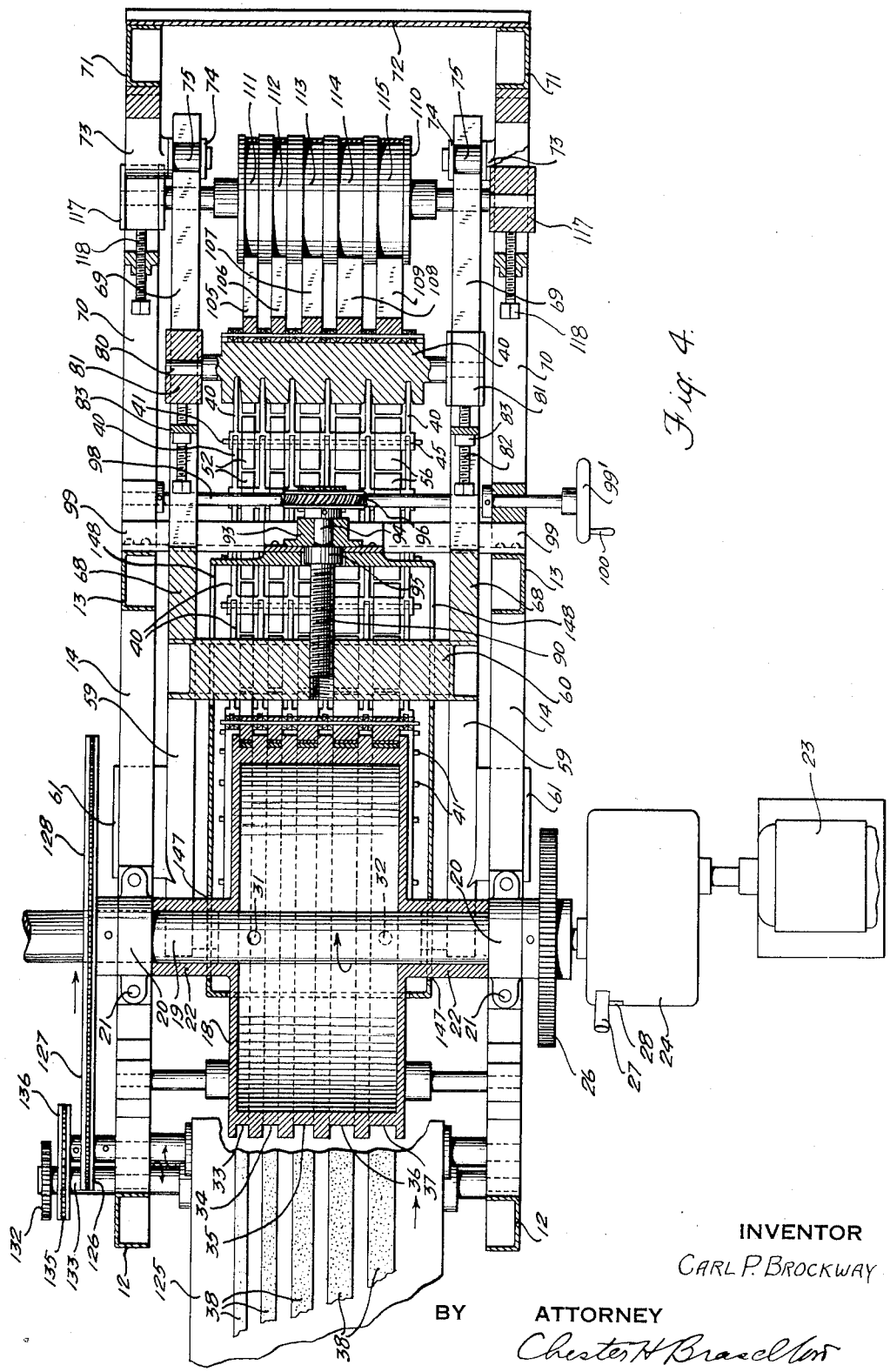
Fig. 4 is a sectional plan view taken on line 4—4 of Fig. 3.

In order to compress the brake lining against the drum sufficiently to get the desired result a plurality of compression shoes are arranged on an endless belt and adapted to travel with the periphery of the drum for a portion of its rotation and in close proximity thereto. To this end a belt slightly wider than the width of the drum 18 is formed of a plurality of links 40 which are hingedly connected together by means of a plurality of transverse connecting rods 41 to form an endless belt which passes over a sprocket 42 at the rear of the machine and two sprockets 43 and 44 above and below the drum 18, the belt passing over the rear surface of the drum for approximately one-half of its periphery. The links 40 are each bifurcated at one end as at 45, Fig. 4, and have a single thickness at the other end so that the single thickness of one link may be inserted between the two portions of the bifurcated end of another link to form a pivotal joint having three thicknesses also shown in the sectional view of Fig. 2 at 45. The sprockets 42, 43, and 44 are triangle in cross-section but are provided with spacers 46, 47, 48, 49, and 50 of sufficient width and formed integral with the sprockets to separate the link change in accordance with the width of the groove 33, 34, 35, 36, and 37. The spacers 46 to 50 inclusive are provided with longitudinal grooves 51 parallel to the axis of the sprocket and adjacent each corner of the triangular sprocket. These grooves are of sufficient size to receive the circular ends of the links so as to mesh with these link ends and the transverse rods as the belt passes over the sprocket.

A plurality of shoes 52, 53, 54, 55, and 56 having a width to fit respectively the grooves 33, 34, 35, 36, and 37 are mounted on each of the cross rods 41 between the links 40 of the chain. The medium width shoe 54 is shown in elevation in Fig. 3 and all of the shoes are provided with a curved outer surface 57 to conform with the curvature of the drum 18 and a cylindrical upper portion 58 provided with a hole for receiving the cross rod 41. The upper cylindrical member 58 also conforms to the shape of the grooves 51 in the various sprockets and mesh with these grooves with the pivotal round portions of the links as the chain passes over the sprockets.

Figure 2:
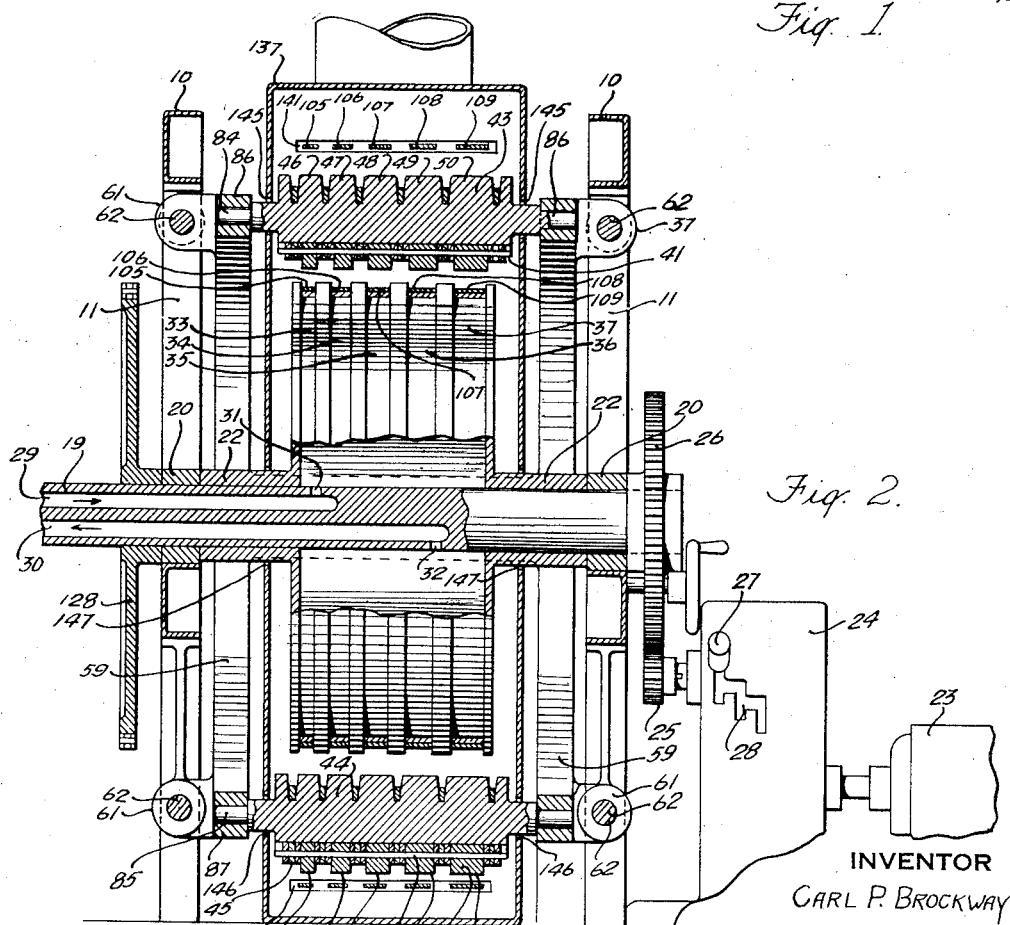
Fig. 2 is a vertical sectional view through the machine taken on the line 2—2 of Fig. 1.
Figure 3:
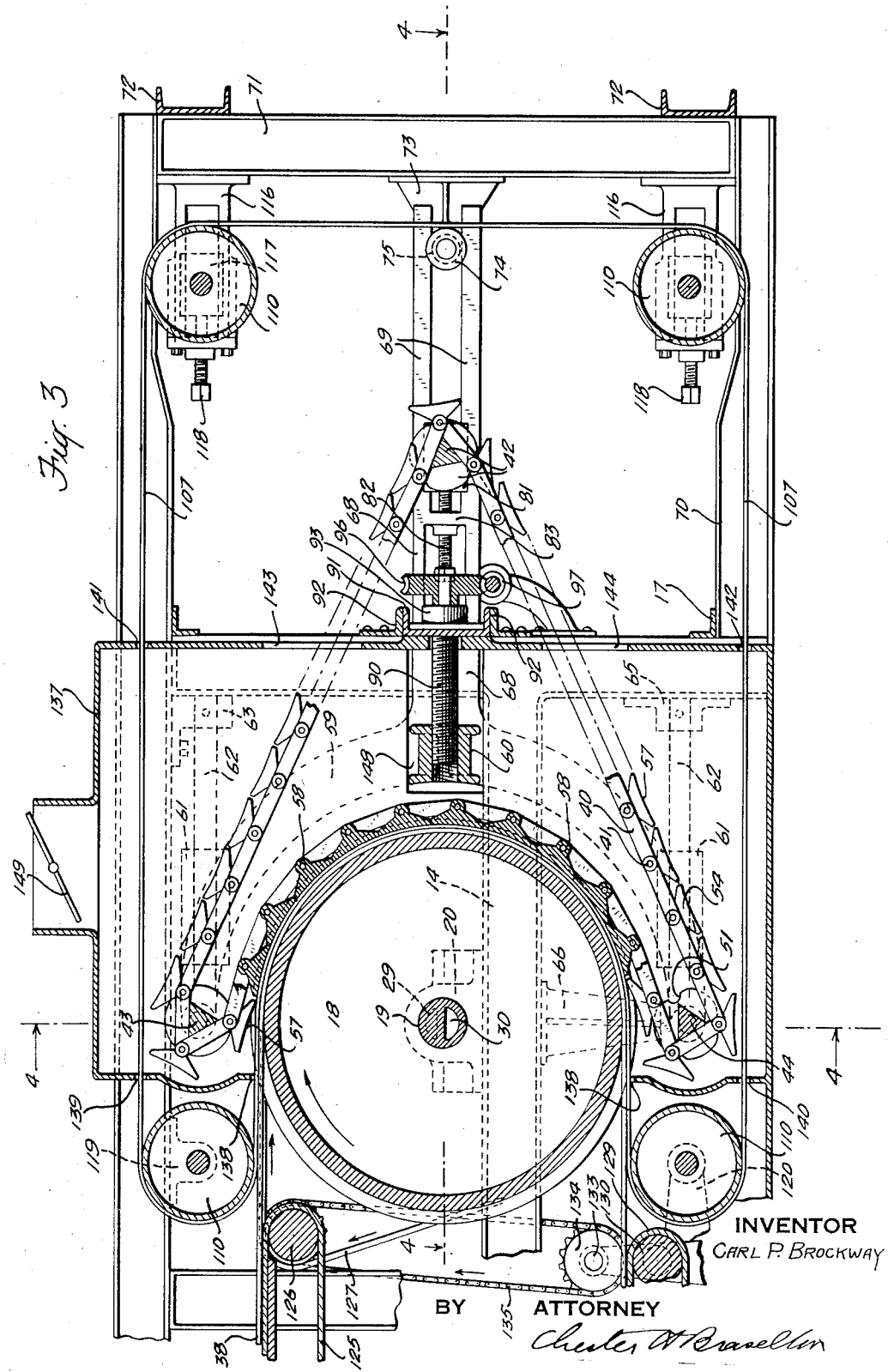
Fig. 3 is a vertical longitudinal sectional view of the machine taken at approximately the center thereof.

In order to support the endless belt of compression shoes in the proper relation to the drum 18 and provide for adjustments of the pressure against the drum I provide a pair of semi-circular yokes 59 rigidly held in spaced relation to each other by means of a beam 60 which extends across the apparatus and is connected at its ends to the centers of the two yokes. The yokes are slidably supported upon the frame by means of sleeves 61 which are formed integral with the yokes adjacent the upper and lower ends thereof and which are arranged to slide upon rods 62 which are supported upon the frame. The upper rods 62 have their rear ends supported in brackets 63 which are attached to the underside of the channels 10 and against the uprights 13 while the forward ends of these rods are supported in brackets 64 which are attached to the underside of the channels 10 as indicated in Figs. 1, 2, and 3. The lower rods 62 as also indicated in those figures are supported at their rear ends by means of brackets 65 attached to the uprights 13 and at their forward ends by brackets 66 which extend downwardly from the underside of the cross members 14 at each side of the machine. Thus supported the yokes 59 are free to move backward and forward sliding upon the rods 62, but in order to further support the yokes and to form a means of supporting the rear sprockets 42 the yokes are extended rearwardly forming members 68 which are bifurcated at their ends to form guide bars 69.

The upper frame channels 10 extend rearwardly beyond the side uprights 13 and a corresponding channel member 70 is mounted beneath each channel bar 10 adjacent the floor level and is secured to the upright 13 and the angle 17. Between the ends of the upper channels 10 and the lower channels 70 are positioned a pair of upright channels 71 and additional channels 72 are provided transversely positioned so as to support the upright channels 71 more rigidly in spaced relation to each other. A bracket member 73 is provided about midway of each of the upright channels 71 and this bracket is provided with a roller 74 which is rotatably mounted thereon and has a groove 75 in which the guiding bars 69 run. This construction permits the yokes 59 to move backward and forward in the same plane and supports the yoke in any position.

The ends of the sprocket 42 are reduced in size to form shaft 80 which is adapted to rotate in bearings 81 slidably mounted between the bars 69 on each side of the machine. Inasmuch as the chain or endless belt always tends to draw the sprocket 42 in a direction toward the left side of the figure in Figs. 3 and 4, an adjusting screw 82 is provided threaded into a cross member 83 connecting the two bars 69 so that rotation of the screw 82 will move the bearing 81 toward the rear or will permit it to move toward the front of the machine depending on which way the screw is rotated.

The forward sprockets 43 and 44 are also reduced at their ends forming respectively shafts 84 and 85 which rotate respectively in bearings 86 and 87 formed on the forward ends of the yokes 59.

A main adjustment is provided so that the shoes and sprockets about which they pass may be moved toward or away from the drum 18 as a whole unit thus adjusting the pressure of the shoes against the drum. To this end a threaded shaft 90 is provided threaded into the cross beam 60 connected to the yokes 69 at about the center thereof, and this shaft passes through a hole in a channel member 91 secured to angles 92 which are positioned transversely across the machine and are connected to the two uprights 13. The channel beam 91 is relatively short and has a bearing 93 riveted or otherwise secured to its center, and the shaft 90 is provided with a reduced portion 94 which rotates in the bearing 93. A collar 95 formed upon the shaft 90 between the threaded portion and the reduced end portion 94 acts as a thrust bearing against the front face of the bearing 93 to prevent the shaft 90 from moving toward the rear of the machine. The rear end of the reduced portion 94 is provided with a worm wheel 96 which meshes with a worm 97 formed on a relatively long shaft 98 whose ends are rotatably mounted in the bearings 99 secured to the uprights 13. One end of the shaft 98 may be provided with a wheel 99' having a suitable handle 100 so that the wheel 99 and the shaft 98 may be rotated, thus rotating the worm and slowly turning the worm wheel 96. Rotation of the worm wheel 96 and shaft 90 causes the beam 60 and the yokes 59 to move backward and forward depending on which direction the screw 90 is rotated and thus the pressure against the drum 18 may be regulated.

If the shoes themselves are permitted to bear against the brake band material there will be a tendency to form ridges in the material due to slight clearances between the shoes. To prevent this I provide a plurality of steel bands which are thin enough to be flexible and have widths corresponding to the grooves in the drum. These are caused to move around the drum 18 between the brake band material and the shoes. Thus bands 105, 106, 107, 108, and 109 are led over two rear pulleys 110 each provided with grooves 111, 112, 113, 114, and 115 corresponding respectively to the different widths of the steel bands and to the widths of the grooves 33, 34, 35, 36, and 37 on the drum 18. Each of these rear pulleys 110 is mounted between brackets 116 mounted on the uprights 71 one at the top and one at the bottom on each side. A bearing 117 is slidably mounted in a bifurcated portion of the bracket 116 and an adjusting screw 118 is provided to adjust the bearing with respect to the bracket. The two forward rollers are mounted upon bearings 119 and 120 attached respectively to the upper channel beams 10 and the lower ends of the uprights 12.

The steel bands in themselves would not be strong enough to compress the brake material against the drum 18 but are used only to provide a surface which is smooth and flexible so that it can be held against the material by the shoes as explained above.

In order to be sure that the brake band material is fed into the machine at the proper speed I may provide an endless belt 125 which passes over a roller 126 driven by a sprocket chain 127 which is in turn driven from a gear wheel 128 attached to the end of the shaft 19 which is opposite the motor. Another endless belt 129 may be provided at the lower end of the machine to receive the brake band material after it has been cured and compressed. This endless belt may be driven by a roller 130 which is mounted in suitable bearings and is provided with a gear 131 which meshes with an idler gear 132 mounted on an auxiliary shaft 133 which also carries a sprocket wheel 134 driven by a chain 135 from another sprocket 136 on the roller shaft 126.

With this construction the drum 18 is heated by passing steam in through the hollow shaft and out again in a continuous stream and the drum is rotated by means of the motor 23 as already described. With the machine rotating in this manner a series of strips 38 of different widths of brake band material may be fed into the machine by means of the endless belt 125. These strips 38 enter their respective grooves in the drum 18 between the steel bands and the drum and as the drum rotates pass around the drum under the shoes carried by the endless belt 40. As the temperature of the brake band strips is raised by the heat of the drum 18 the pressure of the shoes against the steel band is increased so that the strips of brake band are forced to assume a more compact condition, the heat of the drum acting to vulcanize the rubber surrounding the asbestos fibres. When the bands reach the lower end of the drum the strips pass out upon the endless belt 129 which may be arranged to move at a slightly faster speed than the upper belt 125 so as to take care of the slight lengthening of the strips due to the compression thereof.

Heat may be retained around that portion of the drum 18 where the shoes press against it by means of a sheet metal housing 137. The forward end of this housing is provided with an opening 138 large enough to permit the forward side of the drum 18 to protrude therefrom, and an additional slot 139 at the top and another 140 at the bottom may be provided to receive the extreme upper and lower passes of the steel bands. Also the rear end of the housing may be provided with slots 141 and 142 at the upper and lower end respectively to receive the extreme upper and lower passes of the steel bands, and openings 143 and 144 may also be provided to permit the endless belt carrying the pressure shoes to pass out and to enter the housing. The bearings 86 and 87 for the sprockets 43 and 44 are preferably located outside of the casing, the sprocket shafts passing through upper openings 145 and lower openings 146 in the sides thereof. Also the bearings 20 are located outside the casing, opening 147 being provided for the shaft 19. With all of the bearings outside of the casing lubrication thereof is not affected by the high temperature within the casing. Also a slot 148 is provided on each side of the casing to permit the cross beam 60 for the yokes 59 to pass therethrough and to have a limited backward and forward movement therein. If desired a damper 149 may be provided at the top of the housing to somewhat control the circulation of air therethrough.

As is clearly evident the pressure of the shoes against the drum 18 may be regulated by the hand wheel 99 which when rotated in one direction will move the two yokes toward the drum and in the other direction will move them away from the drum while the position of the rear sprocket 42 may be adjusted by turning the adjusting screws 82. The rollers for the steel bands may be adjusted so as to take up the slack of the bands and are not intended to compress the brake band material to any extent against the drum.

It will be noted that the pressure is gradually applied to the brake band material as it enters the space between the steel bands and the drum and is then increased until it reaches a maximum at the center rear position of the drum and then decreases again until it leaves the drum at the bottom. This gradual application of pressure prevents extensive longitudinal squeezing out of the brake band material which is the case where such material is run between two rollers and the pressure is therefore applied at one point. In other words the action is not a pulling out of the material into a longer thinner strip but an actual compression of the material so as to make a more compact strip with a minimum of the lengthening effect.

By controlling the speed of the drum 18 and the temperature of the steam circulated to it the curing and compressing of the brake band material may be regulated so as to get the best results. Also the temperature of the air surrounding the drum may be controlled within certain limits by the damper 149 to further regulate the curing of the material.

Instead of using a plurality of bands to press against each individual strip of brake band material it may be desirable to use one single band wide enough to completely cover the surface of the drum and hence the construction in Figs. 5 and 6 may be used. In these figures a drum 140 is provided with a plurality of grooves 141, 142, 143, 144, and 145 similar in width respectively to the grooves 33, 34, 35, 36, and 37 on the drum 18; but these grooves are made with a depth corresponding to the desired thickness of the brake band material. A single steel band 146 approximately as wide as the drum 140 is adapted to run over a pulley 147 and then down over the drum 140 to a second pulley (not shown) below the drum. Two side flanges 148 may be provided on the ends of the drum 140 to prevent the band 146 from moving off of the drum as the two rotate together. The brake band material 149 is adapted to pass between the band 146 and the drum as shown and similar to the manner described for the preceding figures. The band 146 is urged against the drum or against the brake band material by a plurality of shoes 150 which are similar in contour to the shoes shown in the preceding figures but extend clear across the drum as indicated in Fig. 6. Links 151 at the sides of the shoes 150 are pivotally connected together and to the shoes by means of the pins 152 which are bent into openings in the end of the shoes 150 indicated in Fig. 6. The endless chain formed by the shoes 150 and links 151 may pass over a sprocket 153 similar to the sprocket 43 shown in the previous figures and over two other sprockets (not shown) which are also similar to the sprockets of the preceding figures so that the shoes 150 are caused to move around a portion of the drum 140 thereby pressing the brake band material between the steel band 146 and the drum.

In some instances where the curing process may be carried on without much pressure the construction shown in Figs. 7 and 8 may be used. Here the shoes are entirely eliminated and the steel band 154 is adapted to run in a counter clockwise direction over a relatively large drum 155 mounted above the drum 156 and then down over the surface of that drum in a clockwise direction and over another drum 157 in a counter clockwise direction and then straight up on the right side of the figure to the drum 156 at the top. An idler pulley 158 may be arranged to take the slack in the band 154 by mounting it in a bearing 159 which is slidably supported between bars 160 and adjusted by a screw 161 which has threaded engagement with a portion of the frame 162. By adjusting this pulley 168 toward and away from the frame 162 the tension of the steel band of Fig. 4 may be regulated. It may also be desirable in this construction to compress the brake band material 163 between the drums 155 and 156 as it enters the machine and again between the drums 156 and 157 as it leaves the machine. To this end the drums 155 and 157 may be mounted respectively in bearings 164 and 165 which are slidably mounted respectively in slots 166 and 167 in the frame 162. The tension of the bearings 164 and 165 toward the drum 166 may be controlled by screws 168 and 169 which have threaded engagement with a portion of the frame.

The central drum 166 may be heated by passing steam or other heated fluid through the hollow shaft 169 and if desired the drums 155 and 157 may also be heated by passing the heated fluid in and out through the shafts 170 and 171. By heating the upper and lower drums a more uniform temperature may be obtained because the steel band 164 may otherwise tend to cool off before it contacts again with the brake band lining. A casing 172 may be provided around the three drums 155, 156, and 157, with suitable openings or slots 173 and 174 to permit the brake band material to pass into and out of the casing.

While a single steel band is shown with this type of apparatus it is evident that a plurality of bands might also be used similarly to the construction shown in Figs. 1 to 4 inclusive, the upper and lower drums being provided with grooves to receive and guide the plurality of bands.

Many modifications may be made in the construction of the machine as shown in the drawings and I do not, therefore, desire to limit myself specifically to what has been shown and described except as such limitations occur in the appended claims.

What I desire to claim is:

1. In a device of the class described a rotatable drum, means to rotate said drum, means to heat said drum, channels formed in the periphery of said drum, flexible endless bands each having a width conforming with the width of each of said channels and adapted to fit closely into said channels and follow the periphery of said drum for a relatively large part of their rotation whereby strips of material may be fed between said flexible bands and the bottom of said channels to compress said strips therebetween, and means to gradually increase the pressure of said bands against said strips as said drum rotates, said means comprising a flexible belt and a plurality of shoes on one side of said belt, each shoe having a single pivot connection to said belt.

2. In a device of the class described a rotatable drum, means to rotate said drum, means to heat said drum, channels formed in the periphery of said drum, endless flexible metal bands each having a width substantially equal to the width of each of said channels and arranged to enter said channel and follow the periphery of said drum through a relatively large portion of the rotation thereof, and means to gradually increase the pressure of said band from the time when they first enter said channel to a point midway of their travel in said channels and to thereafter gradually decrease the pressure against said drum, said means comprising a flexible belt and a plurality of shoes on one side of said belt, each shoe having a single pivot connection to said belt.

3. In a device of the class described a rotatable drum, means to rotate said drum, a channel formed in the periphery of said drum, a flexible band arranged to travel in close proximity with the bottom of said channel over a large portion of the periphery of said drum and having a width substantially equal to the width of said channel whereby a strip of material may be fed between said band and drum, and means to gradually increase the pressure of said band against said material as it travels around said drum, said means including a flexible belt and a pressure plate having a single pivot connection to said belt and adapted to fit into said channel and be retained thereby.

4. In a device of the class described a rotatable drum, means to rotate said drum, a channel formed in the periphery of said drum, an endless flexible band arranged to travel in close proximity to the bottom of said channel throughout a large portion of the periphery of said drum and having a width substantially equal to said channel whereby a strip of material may be fed into said channel and will pass between the bottom of said channel and said band throughout a relatively large portion of the periphery of said drum, and means to gradually increase the pressure of said band against said drum from a point where said band enters said channel to substantially the midpoint of the travel of said band around said drum and thereafter decrease the pressure of said band against said drum, said means including a flexible belt and a pressure plate having a single pivot connection to said belt and adapted to fit into said channel and be retained thereby.

5. In a device of the class described a rotatable drum, means to rotate said drum, an endless band arranged to travel in close proximity to said drum throughout a portion of the rotation thereof, a plurality of shoes having a curvature adapted to conform with the curvature of said drum, means to carry said shoes in steady succession around the surface of said drum in contact with said band and to urge said shoes against said band, and means to hold the shoes against lateral movement when said shoes are exerting pressure against said band, each of said shoes having a single pivot connection to said shoe carrying means.

6. In a device of the class described a rotatable drum, means to rotate said drum, a plurality of shoe having curved surfaces to conform with the surface of said drum, means to carry said shoes in succession to move with the periphery of said drum and to urge said shoes towards said drum through a portion of the rotation thereof, means between said drum and said shoes to present a smooth surface whereby a strip of material may be introduced between said last mentioned means and drum for compressing said strip therebetween as it moves around said drum, and means to hold the shoes against lateral movement when said shoes are exerting pressure against said band and each of said shoes having a single pivot connection to said shoe carrying means.

7. In a device of the class described a rotatable drum, means to rotate said drum, a channel formed in the periphery of said drum, a band having a width equal to the width of said channel and arranged to travel in close proximity to said drum in said channel throughout a portion of the rotation of said drum whereby a strip of material may be fed between said band and drum in said channel and will travel around a relatively large portion of said drum therebetween, an endless chain arranged to travel in close proximity with a portion of the periphery of said drum adjacent said band, a plurality of shoes mounted by a single pivot connection on said chain and having surfaces to conform with the surface of said drum and adapted to press against said band to compress said material between said band and said drum, and means to hold the shoes against lateral movement when said shoes are exerting pressure against said band.

8. In a device of the class described a rotatable drum, means to rotate said drum, a channel formed in the periphery of said drum, an endless flexible band having a width approximately equal to the width of said channel and arranged to travel in said channel throughout a relatively large portion of the rotation of said drum whereby a strip of material may be fed between said band and drum to travel therebetween around said drum, an endless chain mounted for rotation in close proximity to a large portion of the periphery of the drum adjacent said band, a plurality of shoes mounted by a single pivot connection upon said chain, each shoe having a surface curved to conform to the curvature of said drum and adapted to engage said band as it travels around said drum, means to regulate the pressure of said shoes against said drum, and means to hold the shoes against lateral movement when said shoes are exerting pressure against said band.

9. In a device of the class described a rotatable drum, means to rotate said drum, means to heat said drum, an endless flexible band adapted to travel in close proximity to said drum throughout a portion of the rotation thereof whereby a strip of material may be fed between said band and said drum to travel around said drum, an endless chain arranged to travel in close proximity to said band for approximately the same distance that it travels around said drum, a plurality of shoes mounted by a single pivot connection upon said chain and having a surface to conform to the surface of said drum and adapted to press against said band whereby said band is pressed toward said drum and said material is compressed therebetween, and means to hold the shoes against lateral movement when said shoes are exerting pressure against said band.

10. In a device of the class described a rotatable drum, means to rotate said drum, and means to press a strip of material against said drum for a relatively large portion of the circumference of said drum, said means comprising a flexible belt and a plurality of shoes on one side of said belt, each shoe having a single pivot connection to the belt.

CARL P. BROCKWAY.